March 31, 1942.     O. G. HOLMES     2,278,267
COLLET
Filed Oct. 17, 1940

INVENTOR.
Ossian G. Holmes
BY Barlow & Barlow
ATTORNEYS.

Patented Mar. 31, 1942

2,278,267

UNITED STATES PATENT OFFICE 2,278,267

COLLET

Ossian G. Holmes, Riverside, R. I., assignor to Brown & Sharpe Manufacturing Company, a corporation of Rhode Island Application October 17, 1940, Serial No. 361,491

7 Claims. (Cl. 279—51)

This invention relates to a collet of the type used in machine tools and is particularly adapted for the auxiliary spindle in a screw machine.

The invention has for one of its objects to provide a collet which will retain engagement with the work which is embraced by the collet so as to prevent the work from whipping.

Another object of the invention is to prevent the collet from whipping in the sleeve and also the work from whipping in the collet.

Another object of the invention is to provide a collet which, although maintaining a contact with the work even when in release position, will clamp the work with equal pressure by all of a plurality of jaws when clamping pressure is applied to the collet.

With these and other objects in view, the invention consists of certain novel features of construction, as will be more fully described, and particularly pointed out in the appended claims.

In the accompanying drawing:

Fig. 1 is a perspective view of the collet;

Fig. 2 is a sectional view through the slots of the collet;

Fig. 3 is an end view of the collet empty;

Fig. 4 is an end view showing in section a piece of work in the collet before clamping there;

Fig. 5 is an end view similar to Fig. 4 showing the jaws in gripping engagement with the work and the sleeve for moving the jaws to this position; and Fig. 6 shows the main spindle in full and the auxiliary spindle in section with the work and a different position of the collet in dot-dash lines.

It is found in certain machine tool operations and in particular in the use of screw machines having a main spindle and an auxiliary spindle which rotate at the same speed and successively hold the work, that the usual collet which is provided in the auxiliary spindle, when moved to release its grip upon the work, permits the work to whip in the spindle. In order that this may be eliminated I have provided a collet having a plurality of jaws which I have so rearranged by tempering them in different set positions that some of these jaws will maintain engagement with the work at all times although with such pressure that feeding of the work through the jaws may be accomplished, while the other jaws, when released, will spring away out of contact with the work and exert no holding action upon the work whatsoever but will contact the sleeve to prevent whipping of the collet in the sleeve; and I have further provided the outer surface of the jaws so that when the clamping sleeve moves the jaws to clamped position, all the jaws will apply equal pressure to the work for securely holding the same in the collet; and the following is a more detailed description of the present embodiment of this invention, illustrating the preferred means by which these advantageous results may be accomplished:

With reference to the drawing, 10 designates generally the collet, and 11 (see Fig. 6), a sleeve which moves the jaws of the collet into clamping position. The collet consists of a tubular body 12 provided with a plurality of slots, here shown as four, designated 13, 14, 15 and 16, to provide a plurality of jaws, here shown as four, consisting of the opposite jaws 17 and 18, and opposed jaws 19 and 20. The tubular body is hollow, as at 21, although of different bores, and the slots heretofore mentioned extend from the end 22 of the body lengthwise to a point just short from the other end. The stock is such that the jaws formed are of a resilient character, and, when pressure upon these jaws tending to force them inwardly is released, the jaws will spring outwardly to a normal position in which they are set by tempering.

The jaws 17 and 18 are so set by tempering that their inner surfaces 23 will be closer to the central axis of the body than the inner surfaces 24 of the other two jaws 19 and 20 when there is no pressure applied upon the jaws. Thus, when work 25 of a certain range of diameters is inserted, the jaws 17 and 18 will be slightly sprung apart, and these will continually contact with this work, while the surface 24 of the jaws 19 and 20 will be spaced from the same work and free therefrom. Different sized collets will be used for work of different diameters. The pressure which is applied by the resilient action alone of the jaws 17 and 18 will be such that the work may be moved by pressure to feed the work frictionally through the jaws while being continually engaged by them.

The outer surface of all of the jaws is beveled as at 26 on the jaws 17 and 18 and as at 27 on the jaws 19 and 20. These beveled surfaces are such that when their inner surfaces form a concentric circle, the beveled surfaces 26 and 27 will also be concentric. Thus, when a sleeve 11 having a female taper 31 to correspond with the beveled surfaces 26 and 27 is forced along the surfaces 26 and 27, all of the jaws, 19 and 20 as well as 17 and 18, will be forced inwardly toward the work to grip the work with equal pressure. However, when this sleeve is moved rearwardly of the taper, the jaws 19 and 20 will spring free from the work toward their normal position to which they have been previously set, and will engage the surface 31 of the sleeve to maintain contact therewith, while the jaws 17 and 18, although pressure will be relieved upon them, will still maintain a contact with the work, although with much reduced pressure due only to the resilience of the jaws. In this way I prevent the work from whipping in the collet and also the collet from whipping in the sleeve 11.

A chamfer for guiding the work into the opening between the jaws is provided as at 28 on the jaws 17 and 18 and at 29 on the jaws 19 and 20, the former chamfer being somewhat greater than the latter, as the jaws 17 and 18 extend inwardly to a greater extent.

Threaded means 30 are provided at the rear end of the collet for assembling it in the machine which is to be operated and the sleeve is shown as a part of the usual auxiliary spindle 32.

The collet may be either the solid type or the type utilizing replaceable pads.

I claim:

1. A collet for a machine tool comprising a tubular body provided with a plurality of jaws, each jaw provided with an inner friction work-gripping surface and an outer surface to cooperate with a sleeve for the application of pressure on the jaws, some of said jaws when being free from the influence of any pressure or force having their gripping surface positioned at a greater distance from the axis of the body than other of said jaws whereby work of certain diameters may be constantly engaged by some of the jaws and engaged by other of said jaws only when binding pressure is applied.

2. A collet for a machine tool comprising a tubular body provided with slots extending longitudinally thereof to provide a plurality of resilient jaws, each jaw provided with an inner friction work-gripping surface and an outer surface to cooperate with a sleeve for the application of equal pressure on the jaws when gripping the work, some of said jaws when being free from the influence of any pressure or force having their gripping surface positioned at a greater distance from the axis of the body than other of said jaws whereby work of certain diameters may be constantly engaged by some of the jaws and engaged by other of said jaws only when binding pressure is applied.

3. A collet for a machine tool comprising a tubular body provided with a plurality of jaws, each jaw provided with an inner friction work-gripping surface and an outer surface to cooperate with a sleeve for the application of pressure on the jaws, some of said jaws when being free from the influence of any pressure or force having their gripping surface positioned at a greater distance from the axis of the body than other of said jaws whereby work of certain diameters may be constantly engaged by some of the jaws and engaged by other of said jaws only when binding pressure is applied, each of said jaws being beveled at its free end to assist in guiding the work thereinto.

4. A collet for a machine tool comprising a tubular body provided with a plurality of jaws, each jaw provided with an inner friction work-gripping surface and an outer surface to cooperate with a sleeve for the application of pressure on the jaws, some of said jaws when being free from the influence of any pressure or force having their gripping surface positioned at a greater distance from the axis of the body than other of said jaws whereby work of certain diameters may be constantly engaged by some of the jaws and engaged by other of said jaws only when binding pressure is applied, each of said jaws being beveled at its free end to assist in guiding the work thereinto, the jaws at the said greater distance being beveled less than the other jaws.

5. A collet for a machine tool comprising a tubular body provided with a plurality of jaws, each jaw provided with an inner friction work-gripping surface and an outer surface to cooperate with a sleeve for the application of pressure on the jaws, some of said jaws when being free from the influence of any pressure or force having their gripping surface positioned at a greater distance from the axis of the body than other of said jaws whereby work of certain diameters may be constantly engaged by some of the jaws and engaged by other of said jaws only when binding pressure is applied, the pressure of the jaws constantly engaging the work being such that the work may be frictionally fed therethrough.

6. A collet for a machine tool comprising a tubular body provided with four slots extending longitudinally thereof to provide four resilient jaws, each jaw provided with an inner friction work-gripping surface and an outer surface so spaced with reference to the surface of a sleeve to engage the same as to cause the application of equal pressure on the jaws, two of said jaws when being free from the influence of any pressure or force having their gripping surface positioned at a greater distance from the axis of the body than the other two of said jaws whereby work of certain diameters may be constantly engaged by two of the jaws and engaged by the other two of said jaws only when binding pressure is applied.

7. In combination, a machine tool sleeve, a collet within the sleeve comprising a tubular body provided with a plurality of jaws each jaw provided with an inner friction work-gripping surface and an outer sleeve-engaging surface upon which pressure is applied to the jaws, some of said jaws when being free from the influence of any pressure or force having their sleeve-engaging surface engaging the sleeve, and other of said jaws free from the sleeve and positioned inwardly sufficiently to engage the work, whereby work of certain diameters may be constantly engaged by some of the jaws and engaged by other of said jaws only when binding pressure is applied by relative movement of the sleeve whereby whipping of the collet in the sleeve and the work in the collet is minimized.

OSSIAN G. HOLMES.